United States Patent
Drofenik et al.

(10) Patent No.: US 12,119,750 B2
(45) Date of Patent: Oct. 15, 2024

(54) REDUNDANCY OF A RESONANT CONVERTER STAGE BY FREQUENCY ADAPTATION

(71) Applicant: ABB Schweiz AG, Baden (CH)

(72) Inventors: Uwe Drofenik, Zürich (CH); Ki-Bum Park, Fislisbach (CH); Thomas Bernhard Gradinger, Aarau Rohr (CH)

(73) Assignee: ABB SCHWEIZ AG, Baden (CH)

( * ) Notice: Subject to any disclaimer, the term of this patent is extended or adjusted under 35 U.S.C. 154(b) by 305 days.

(21) Appl. No.: 17/753,963

(22) PCT Filed: Sep. 18, 2020

(86) PCT No.: PCT/EP2020/076152
§ 371 (c)(1),
(2) Date: Mar. 18, 2022

(87) PCT Pub. No.: WO2021/053170
PCT Pub. Date: Mar. 25, 2021

(65) Prior Publication Data
US 2022/0385176 A1 Dec. 1, 2022

(30) Foreign Application Priority Data
Sep. 20, 2019 (EP) .................................. 19198721

(51) Int. Cl.
*H02M 3/335* (2006.01)
*H02M 1/00* (2006.01)
(Continued)

(52) U.S. Cl.
CPC ..... *H02M 3/33523* (2013.01); *H02M 1/0009* (2021.05); *H02M 1/0058* (2021.05);
(Continued)

(58) Field of Classification Search
CPC ........... H02M 3/33523; H02M 1/0009; H02M 1/0058; H02M 3/015; H02M 3/33571
See application file for complete search history.

(56) References Cited

U.S. PATENT DOCUMENTS 10,283,261 B2 * 5/2019 Jin ........................ H02M 7/515
2010/0328968 A1 * 12/2010 Adragna ................ H02M 3/01
363/21.02

(Continued)

FOREIGN PATENT DOCUMENTS

| EP | 2299580 A2 | 3/2011 |
|---|---|---|
| WO | 2014070998 A1 | 5/2014 |

OTHER PUBLICATIONS

Figge H. et al.; "Paralleling of LLC Resonant Converters Using Frequency Controlled Current Balancing", University of Paderborn, Power Electronics and Electric Drives; Delta Energy Systems GmbH, Germany; 2008; pp. 1080-1085.
(Continued)

*Primary Examiner* — Kyle J Moody
(74) *Attorney, Agent, or Firm* — Greenberg Traurig, LLP

(57) ABSTRACT

A resonant DC/DC converter which has a first DC link, preferably including a first DC link capacitor; a DC/AC converter which has a first plurality of N>1 converter bridges connected in parallel to the first DC link; each converter bridge comprising a plurality of switches each of which may be switched between a conducting state and a non-conducting state. The resonant DC/DC converter also includes an AC intermediate circuit having an input connected to an output of the DC/AC converter and comprising: a transformer, preferably a medium frequency transformer, having a primary side and a secondary side; the primary side comprising at least one primary winding; a first plurality of N capacitors, wherein for each converter bridge, a different one from the first plurality of capacitors is connected between said converter bridge and the at least one primary winding.

19 Claims, 4 Drawing Sheets

(51) Int. Cl.
*H02M 3/00* (2006.01)
*H02M 7/493* (2007.01)
(52) U.S. Cl.
CPC .............. *H02M 3/01* (2021.05); *H02M 3/015* (2021.05); *H02M 3/33571* (2021.05); *H02M 7/493* (2013.01)

(56) References Cited

U.S. PATENT DOCUMENTS

| | | |
|---|---|---|
| 2012/0262953 A1 | 10/2012 | Jungreis et al. |
| 2016/0072388 A1* | 3/2016 | Dubus ................. H02M 3/3376 363/25 |
| 2017/0070150 A1 | 3/2017 | Kim |
| 2018/0269796 A1 | 9/2018 | Yamaoka et al. |

OTHER PUBLICATIONS

Extended European Search Report, issued by European Patent Office, regarding corresponding patent application Serial No. EP 19198721.3; dated Mar. 9, 2020; 9 pages.

International Search Report and Written Opinion, issued by the ISA/EP European Patent Office, regarding corresponding patent application Serial No. PCT/EP2020/076152; dated Nov. 9, 2020; 18 pages.

\* cited by examiner

REDUNDANCY OF A RESONANT CONVERTER STAGE BY FREQUENCY ADAPTATION

CROSS-REFERENCE TO RELATED APPLICATIONS

This is a national stage application which claims priority to International patent application Serial No.: PCT/EP2020/076152, filed on Sep. 18, 2020; which claims priority to European patent application Serial No. 19198721.3, filed on Sep. 20, 2019; and which are herein incorporated by reference in their entirety.

FIELD OF THE INVENTION

The invention pertains to the field of power electronics. It relates to a resonant DC/DC converter, and to a method for controlling such a converter, in accordance with the independent patent claims.

BACKGROUND OF THE INVENTION

In distributed energy applications like electric vehicle (EV) fast charging, photovoltaic (PV) solar, battery energy storage systems (BESS), wind (onshore or offshore), or datacenter, there is the requirement for electric converter like inverters or rectifiers to provide galvanic insulation and to handle large currents, in particular currents above 100 A, or more specifically, above 200 A or even 500 A. A large number of semiconductor switches has to be put in parallel to provide power switches that can conduct and switch, in particular interrupt a required or desired current without unnecessary and/or extensive losses, as required in particular to build or employ solid state transformers (SSTs). Homogeneous distribution of losses—and thus individual currents—in the parallel chips is difficult to achieve due to parasitics, and inhomogeneous temperatures, geometries and semiconductor properties. This is a challenge especially for future high-current applications of wide bandgap semiconductors due to fast switching speeds, in particular at (switching) frequencies above 1 kHz, or more specifically above 5 kHz or even 10 kHz, and generally relatively small chip size.

While putting a large number of semiconductor switches in parallel theoretically allows for handling, in particular switching and/or conducting the desired and/or required large current, this requires an at least essentially homogeneous distribution of losses in the parallel chips for currents through the individual chips to be at least essentially perfectly balanced. Such an at least essentially homogeneous distribution is difficult to achieve due to parasitics, inhomogeneous temperatures, geometries and/or (individual) semiconductor properties, or rather (statistic) variation of such properties between individual semiconductor chips contained by the semiconductor switches, e.g. due to (non-zero) manufacturing tolerances. A relatively high effort, including e.g. pre-selection of semiconductor switches, chips and/or power modules, selection/development of specific module layouts, selection/development of dedicated gate driver technology, is required to balance the currents sufficiently well. Even then, balancing becomes increasingly difficult with an increasing number of chips, in particular semiconductor switches, which may e.g. be as low as 10, 5 or even 2, and becomes a challenge especially for future high-current applications of wide bandgap semiconductors.

An additional problem becoming increasingly severe with an increasing number of components, in particular semiconductor switches, is a potentially reduced system reliability due to an increased probability that any one of the components fails.

"Paralleling of LLC resonant converters using frequency controlled current balancing" by Figge et al (Power Electronics Specialist Conference 2008, IEEE) describes a LLC resonant converter drawn as a half-bridge topology (FIG. 1) for use in a switchmode power supply (FIG. 8). Each LLC resonant converter includes a transformer, a pair of switches S1, S2 attached to a DC link, and a resonance capacitor Cs joined between the output of the half-bridge and the primary winding of each transformer. The difference between the currents measured at the output of each LLC are input into a balanced load controller, and the switching frequencies of each LLC are adjusted to minimise said difference.

It is an objective of the invention to provide a resonant DC/DC converter with parallelly connected semiconductor switches which exhibits increased system reliability, as well as a control method for a resonant DC/DC converter with parallelly connected semiconductor switches which allows to increase system reliability.

SUMMARY OF THE INVENTION

This objective is achieved by a resonant DC/DC converter, and by a method for controlling such a converter with the feature combination of the independent patent claims. Further exemplary embodiments are evident from the dependent claims and the following description in combination with the accompanying drawings.

A resonant DC/DC converter in accordance with the invention, and a method for controlling a respective DC/DC converter may comprise the following features, elements, and/or steps: a first DC link, preferably comprising a first DC link capacitor; a DC/AC converter comprising a first plurality of N>1 converter bridges connected in parallel to the first DC link; each converter bridge comprising a plurality of switches each of which may be switched between a conducting state and a non-conducting state; an AC intermediate circuit having an input connected to an output of the DC/AC converter and comprising: a transformer, preferably a medium frequency transformer, having a primary side and a secondary side; with the primary side comprising at least one primary winding; a first plurality of N capacitors, wherein for each converter bridge, a different one from the first plurality of capacitors is connected between said converter bridge and the at least one primary winding; a control unit configured to switch semiconductor switches of the converter bridges between the conducting and the non-conducting state or vice versa with a predetermined first switching frequency to supply an AC current and/or voltage to the AC intermediate circuit; a plurality of N current sensing means, wherein for each converter bridge a different one of the plurality of current sensing means is provided for monitoring a current through said converter bridge; wherein the control unit is configured to determine whether a current through one of the converter bridges deviates from an expected value; and to adapt, in particular increase, the predetermined first switching frequency if the current through one of the converter bridges deviates from the expected value.

The first plurality of N>1 converter bridges may be regarded as part of a DC/AC converter or inverter having an input connected to the first DC link, which may in turn be connected to a grid via a converter, or to a DC electric power source like a PV solar system or a BESS, wherein the DC/AC converter is configured to provide an AC voltage and/or current at an output of said DC/AC converter.

The transformer as part of an AC intermediate circuit may have an input and/or primary side connected to the output of said DC/AC converter. The AC intermediate circuit may include additional elements, in particular capacitors or inductors connected in parallel with the input or an output or secondary side of the AC intermediate circuit, or in series between input or output of the AC intermediate circuit and the transformer. The transformer may, in particular, be provided with a single primary and/or a single secondary winding only, but will in general comprise a plurality of primary windings and/or a plurality of secondary windings.

The output and/or secondary side of the AC intermediate circuit may be connected to an input of an AC/DC converter configured to convert an AC current and or voltage output by the AC intermediate circuit to a DC voltage and/or an (intermittent) DC current at an output of the AC/DC converter, which may in turn be connected to a second DC link, preferably a second DC link capacitor, at which a load may be connected. If the converter is adapted for bi-directional operation, in particular allowing for bi-directional electric power flow, the load may at least temporarily also act as a generating source.

The first DC link may provide at least a first and a second voltage levels, in particular a zero or neutral level and a positive level. The first DC link may also, in particular, provide a positive level, a zero or neutral level, and a negative voltage level.

The converter bridges may in particular be active bridges of arbitrary topology that can apply at least either one of two voltage levels as provided by the first DC link to the input, in particular to input terminals, of the AC intermediate circuit. This may include half-bridges, full bridges, star-point clamped bridges and any kind of multi-stage topologies. For example, a three-point bridge allows the application of a positive voltage, a negative voltage and a zero voltage to the input of the AC intermediate circuit.

Thus, the converter bridges comprise a plurality of switches each of which may be switched between a conducting state and a non-conducting state; and corresponding switched connections, which allow for establishing or interrupting connections between the input of the AC intermediate circuit and each of the voltage levels. The switches may, in particular, operate under control by a control unit, in particular a controller or a control system, which may be internal to the DC/AC converter, or may be provided externally. Control may in particular be open-loop control. The control unit may be configured to allow or provide for zero current switching (ZCS) or zero voltage switching (ZVS) to minimize switching losses. The control unit may be configured to switch the switches with a first switching frequency, in particular a predetermined first switching frequency, between the conducting state and the non-conducting state or vice versa, to supply an AC current and/or voltage to the AC intermediate circuit.

All of the converter bridges connected in parallel to the first DC link may have identical topology. Corresponding switches of all the converter bridges may be configured to operate in an at least essentially synchronized manner. In particular, the controller or control system, may switch all corresponding switches on at least essentially simultaneously, and may switch all said corresponding switches off at least essentially simultaneously. In particular, by way of example, all switches connecting to the first voltage level may be switched on at least essentially simultaneously, while, in particular approximately simultaneously, all switches connecting to the second voltage level are switched off at least essentially simultaneously; and vice versa.

The switches may, in particular, be semiconductor switches including transistors, in particular BJTs (bipolar junction transistors), MOSFETs (metal oxide semiconductor field-effect transistors), IGBTs (integrated gate bipolar transistors); or thyristors, in particular GTOs (gate turn-off thyristors), GCTs (gate commutated thyristors), or IGCTs (integrated gate commutated thyristors).

The N capacitors connected between the N converter bridges and the at least one primary winding, together with any further capacitors possibly connected between the N converter bridges and the at least one primary winding as detailed further below, jointly act as resonant capacitors for the resonant DC/DC converter, in analogy to the (single) resonant capacitor of a conventional resonant DC/DC converter. Said capacitors may thus be regarded as split resonant capacitors, with each individual one of said capacitors acting as a partial resonant capacitor. Due to the presence of these partial resonant capacitors, current through each active half bridge or bridge leg is not defined by power module parasitics, inhomogeneous temperature distributions and/or semiconductor switch characteristics (which are not perfectly equal for all chips), but by the resonant tank which is defined by the transformer stray flux (approximately equal for all parallel wires) and the split resonant capacitors (which have, in a defined range, a limited maximum deviation from a referenced capacitance. e.g. 5%). This allows for making a current distribution between the individual converter bridges homogenous and stable without requiring additional measures or effort.

A plurality of N current sensing means is provided to monitor, in particular to measure or otherwise obtain, an indication of a current $I_{sensed,i}$ through an i-th one of the converter bridges, in particular an AC current output by or from of the i-th converter bridge, with $i \in \{1, \ldots, N\}$. Each current sensing means may be a current sensor, in particular an AC current sensor capable of and/or configured to measure an AC current output by one of the converter bridges. Any kind of means capable of giving at least rough indication of the current, in particular of an order of magnitude of the current, may be sufficient for use as a current sensing means. The sensed current values $I_{sensed,i}$ may in particular be root-mean-square values, or averages of absolute current values.

The control unit is configured to determine whether the current $I_{sensed,i}$ through the i-th one of the converter bridges, in particular a first converter bridge, deviates from an expected value; in particular whether an absolute value of the current $I_{sensed,i}$ is smaller, in particular significantly smaller than an expected value $I_{expected}$, i.e. whether in particular, $|I_{sensed,i}| \ll I_{expected}$. Said expected value $I_{expected}$ may be derived from a nominal, rated and or maximum current for the DC/DC converter, or any component thereof, in particular the semiconductor switches or the transformer winding or windings, in particular by selecting a value for $I_{expected}$ which is significantly smaller than any such nominal, rated and or maximum current. Alternatively, a value of less than 1 A, 100 mA, 10 mA or 1 mA may be chosen for $I_{expected}$. A determination by the control unit that the absolute value of the current Ies, is smaller, in particular significantly smaller than an expected value $I_{expected}$ may also be derived from sensations or observations other than a current measurement; e.g. by a frequency measurement, in particular at an output of the i-th one of the converter bridges, in particular where such frequency measurement yields an unexpected or indefinite value, or from a signal from a gate driver of a semiconductor switch comprised by the i-th one of the converter bridges.

If the current $I_{sensed,i}$ through the i-th one of the converter bridges is found to deviate from the expected value; in particular if an absolute value of the current $I_{sensed,i}$ is found to be smaller, in particular significantly smaller than an expected value $I_{expected}$, it may be assumed that the said i-th one of the converter bridges is defective. The control unit will then adapt, in particular increase the switching frequency with which the remaining converter bridges, i.e. all j-th converter bridges with i≠j∈{1, ..., N} are switched. The i-th one of the converter bridges may, in addition, be actively deactivated by the control system, in particular by the control system no longer sending switching signals, and/or by setting or attempting to set the switches of said bridge to a non-conducting state.

The switching frequency may, in particular, be adapted as follows, in particular if exactly N capacitors are connected between the N converter bridges and the at least one primary winding: For an initial switching frequency of $f_{res}$ applied when all of the N converter bridges are active and/or property functioning a first adapted switching frequency $f_{res}^{adapted,1}$ may be determined and/or set according to $$f_{res}^{adapted,1} = f_{res} \cdot \frac{1}{\sqrt{1 - \frac{1}{N}}},$$

which will subsequently be applied for switching the switches of the remaining N−1 converter bridges after a first converter bridge has become defective. In the unlikely event that 1<n<N converter bridges should or have become defective, a second adapted switching frequency $f_{ras}^{adapted,2}$ may be determined and/or set according to $$f_{res}^{adapted,2} = f_{res} \cdot \frac{1}{\sqrt{1 - \frac{n}{N}}},$$

which will subsequently be applied for switching the switches of the remaining, i.e. non-defective N-n converter bridges.

Preferred embodiments of the present invention, in particular as described above, may be realized as detailed in the numbered embodiments in accordance with the items listed below, advantageously in combination with one or more of the features as detailed above, or in accordance with the figures and detailed description of preferred embodiments and/or the claims as presented further below.

1) A resonant DC/DC converter, comprising
 a) a first DC link, preferably comprising a first DC link capacitor;
 b) a first plurality of N>1 converter bridges connected in parallel to the first DC link; each converter bridge comprising a plurality of switches, in particular semiconductor switches, each of which may be switched between a conducting state and a non-conducting state;
 c) a transformer, preferably a medium frequency transformer, having a primary side and a secondary side; with the primary side comprising at least one primary winding;
 d) a first plurality of N capacitors, wherein
 e) for each converter bridge, a different one from the first plurality of capacitors is connected between said converter bridge and the at least one primary winding;
 f) a control unit configured to switch switches of the converter bridges between the conducting and the non-conducting state or vice versa with a (predetermined) first switching frequency $f_{res}$;
 g) a plurality of N current sensing means, wherein for each converter bridge a different one of the plurality of current sensing means is provided for monitoring a current through said converter bridge;
 h) the control unit is configured to determine whether a current through one of the converter bridges deviates from an expected value; and to adapt, in particular increase, the (predetermined) first switching frequency the current through one of the converter bridges deviates from the expected value.

2) A resonant DC/DC converter, comprising
 a) a first DC link, preferably comprising a first DC link capacitor;
 b) a DC/AC converter comprising a first plurality of N>1 converter bridges connected in parallel to the first DC link; each converter bridge comprising a plurality of switches, in particular semiconductor switches, each of which may be switched between a conducting state and a non-conducting state;
 c) an AC intermediate circuit connected to the DC/AC converter and comprising
  i) a transformer, preferably a medium frequency transformer, having a primary side and a secondary side; with the primary side comprising at least one primary winding;
 d) a first plurality of N capacitors, wherein
 e) for each converter bridge, a different one from the first plurality of capacitors is connected between said converter bridge and the at least one primary winding;
 f) a control unit configured to switch switches of the converter bridges between the conducting and the non-conducting state or vice versa with a switching frequency to supply an AC current and/or voltage to the AC intermediate circuit;
 g) a plurality of N current sensing means, wherein for each converter bridge a different one of the plurality of current sensing means is provided for monitoring a current through said converter bridge;
 h) the control unit is configured to determine whether a current through one of the converter bridges deviates from an expected value; and to adapt, in particular increase, the switching frequency the current through one of the converter bridges deviates from the expected value.

3) The resonant DC/DC converter in accordance with any of the preceding embodiments, wherein the control system is configured to adapt the switching frequency according to an adapted switching frequency $$f_{res}^{adapted,1} = f_{res} \cdot \frac{1}{\sqrt{1 - \frac{1}{N}}}.$$

4) The resonant DC/DC converter in accordance with any of the preceding embodiments, wherein the control unit is configured to determine whether a current through one of the converter bridges deviates from an expected value by determining whether said current, in particular an absolute value of said current, is smaller than a given threshold.
5) The resonant DC/DC converter in accordance with any of the preceding embodiments, wherein the control unit is configured to determine whether a current through one of the converter bridges deviates from an expected value by determining whether said current is at least approximately zero, in particular smaller than $1/100$, $1/1000$ or $1/10000$ of a rated, nominal and/or maximum current of the converter bridge.
6) The resonant DC/DC converter in accordance with any of the preceding embodiments, wherein if the control unit is configured to, upon determination that the current through one of the converter bridges deviates from an expected value, deactivate said converter bridge.
7) The resonant DC/DC converter in accordance with the preceding embodiment, wherein for each converter bridge, a different one from the plurality of current sensing means is provided between said converter bridge and the at least one primary winding, in particular between said converter bridge and the capacitor connected between said converter bridge and the at least one primary winding.
8) The resonant DC/DC converter in accordance with any of the preceding embodiments wherein AC current sensors are used as current sensing means for measuring an AC current output by the converter bridges.
9) The resonant DC/DC converter in accordance with any of the preceding embodiments wherein, further comprising
   a) an AC/DC converter connected to the secondary side of the AC intermediate circuit,
   b) a second DC link, preferably a second DC link capacitor, connected to an output of the AC/DC converter.
10) The resonant DC/DC converter in accordance with any of the preceding embodiments, wherein each of the converter bridges is an inverter half-bridge comprising a first input terminal and a second input terminal, an converter bridge output (alternatively conductively connectable to the first or second input terminal by means of a plurality of semiconductor switches), wherein for each inverter half-bridge, a different one of the first plurality of capacitors is connected in series with the converter bridge output.
11) The resonant DC/DC converter in accordance with any of the preceding embodiments, and with
    a) the primary side of the transformer comprising a plurality of $M>1$ primary windings, each of the plurality of primary windings having a first and a second terminal;
    b) a second plurality of M capacitors; and wherein
    c) each of the first plurality of N capacitors is connected between one of the converter bridges and a common node (C);
    d) each of the second plurality of M capacitors is connected between the common node and the first terminal of a different one of the plurality of primary windings.
12) The resonant DC/DC converter in accordance with any of the preceding embodiments, and with
    a) the primary side of the transformer comprising a plurality of $M>1$ primary windings, each of the plurality of primary windings having a first and a second terminal;
    b) a second plurality of M capacitors; the DC/DC converter further comprising
    c) a plurality O of common nodes with $O<N$ and $O<M$ and wherein
    d) each of the first plurality of N capacitors is connected between one of the converter bridges and one of the common nodes;
    e) each of the second plurality of M capacitors is connected between one of the common nodes and the first terminal of a different one of the plurality of primary windings.
13) The resonant DC/DC converter in accordance with any of the preceding embodiments, wherein $M \neq N$, preferably $M<N$.
14) The resonant DC/DC converter in accordance with any of the preceding embodiments, and with the primary side of the transformer comprising a plurality of N primary windings, each of the plurality of primary windings having a first and a second terminal; wherein the converter bridges and the primary windings are connected in pairs via a different one from the first plurality of capacitors connected to the first terminal of the respective one from the plurality of primary windings.
15) The resonant DC/DC converter in accordance with any of the preceding embodiments, wherein
    a) each of the converter bridges is an inverter half-bridge comprising a first input terminal and a second input terminal, an converter bridge output (alternatively conductively connectable to the first or second input terminal by means of a plurality of semiconductor switches),
    b) each capacitor has a first terminal and a second terminal, and wherein
    c) for each inverter half-bridge, the first terminal of each of the respective one of the plurality of capacitors is connected to the respective converter bridge output, and
    d) the second terminals of all capacitors from the first plurality of N capacitors are connected together at the common node.
16) The resonant DC/DC converter in accordance with any of the preceding embodiments, wherein
    a) each of the converter bridges is an inverter half-bridge comprising a first input terminal and a second input terminal, an converter bridge output (alternatively conductively connectable to the first or second input terminal by means of a plurality of semiconductor switches),
    b) each capacitor has a first terminal and a second terminal, and wherein
    c) for each inverter half-bridge, the first terminal of each of the respective one of the plurality of capacitors is connected to the respective converter bridge output, and
    d) the second terminal of each of the capacitors from the first plurality of N capacitors is connected to a different primary winding.
17) The resonant DC/DC converter in accordance with any of the preceding embodiments, wherein the second terminals of all of the plurality of primary windings are connected together.
18) The resonant DC/DC converter in accordance with any of the preceding embodiments, wherein
    a) the first DC link has a positive terminal and negative terminal, b) the first input terminals of all inverter half-bridges are connected to the positive terminal, and
c) the second input terminals of all inverter half-bridges are connected to the negative terminal.

19) The resonant DC/DC converter in accordance with any of the preceding embodiments, wherein the first DC link further has a neutral terminal and the second terminals of all of the plurality of primary windings are connected to the neutral terminal.

20) The resonant DC/DC converter in accordance with any of the preceding embodiments, wherein the converter is a resonant converter, and each of the plurality of capacitors is a capacitor.

21) The resonant DC/DC converter in accordance with any of the preceding embodiments, further comprising
a) a second DC link, preferably a second DC link capacitor
b) a second plurality of N'>1 converter bridges connected in parallel to the second DC link;
c) the secondary side of the transformer comprising at least one secondary winding;
d) the converter further comprises a second plurality of N' capacitors, wherein
e) for each converter bridge from the second plurality of N'>1 converter bridges, a different one from the second plurality of capacitors is connected between said converter bridge and the at least one secondary winding.

22) The resonant DC/DC converter in accordance with any of the preceding embodiments, wherein
a) each one of the first plurality of N>1 converter bridges is an converter bridge;
b) the secondary side of the transformer comprises at least one secondary winding; the converter further comprising:
c) a second DC link, preferably a second DC link capacitor;
d) a second plurality of N'>1 rectifier bridges connected in parallel to the second DC link;
e) a third plurality of N' capacitors, wherein
f) for each rectifier bridge, a different one from the third plurality of capacitors is connected between said rectifier bridge and the at least one secondary winding.

23) The resonant DC/DC converter in accordance with any of the preceding embodiments, wherein, with
a) the secondary side of the transformer comprising a plurality of M'>1 secondary windings, each of the plurality of secondary windings having a first and a second terminal;
b) a fourth plurality of M' capacitors; and wherein
c) each of the third plurality of N' capacitors is connected between one of the converter bridges and a further common node;
d) each of the fourth plurality of M' capacitors is connected between the further common node and the first terminal of a different one of the plurality of secondary windings.

24) The resonant DC/DC converter in accordance with any of the preceding embodiments, further comprising
a) a second DC link, preferably a second DC link capacitor
b) a second plurality of N'>1 converter bridges connected in parallel to the second DC link; with
c) the secondary side of the transformer comprising a plurality of N' secondary windings, each of the plurality of secondary windings having a first and a second terminal; wherein the converter bridges and the secondary windings are connected in pairs via a different one from the third plurality of capacitors connected to the first terminal of the respective one from the plurality of secondary windings.

25) The resonant DC/DC converter in accordance with any of the preceding embodiments, wherein the converter bridges of the first plurality of N>1 converter bridges are active bridges configured to operate in an at least essentially synchronized manner, and if present, the converter bridges of the second plurality of converter bridges are also active bridges configured to operate in an at least essentially synchronized manner.

26) A method for controlling a resonant DC/DC converter, said converter comprising
a) a first DC link (10), preferably comprising a first DC link capacitor,
b) a first plurality of N>1 converter bridges connected in parallel to the first DC link and adapted to be switched with a switching frequency $f_{res}$;
c) a transformer, preferably a medium frequency transformer (2141), having a primary side and a secondary side; with the primary side comprising at least one primary winding;
d) a first plurality of N capacitors, wherein
e) for each converter bridge, a different one from the first plurality of capacitors is connected between said converter bridge and the at least one primary winding; the method comprising the steps of:
f) for each converter bridge, monitoring a current through said converter bridge:
g) determining whether the current through a first converter bridges deviates from an expected value;
h) adapting, in particular increasing, the switching frequency if the current through a first converter bridges deviates from the expected value.

27) A method for controlling a resonant DC/DC converter, said converter comprising
a) a first DC link 10, preferably comprising a first DC link capacitor;
b) a DC/AC converter comprising a first plurality of N>1 converter bridges connected in parallel to the first DC link; each converter bridge comprising a plurality of semiconductor switches each of which may be switched between a conducting state and a non-conducting state;
c) an AC intermediate circuit connected to the DC/AC converter and comprising
i) a transformer, preferably a medium frequency transformer, having a primary side and a secondary side; with the primary side comprising at least one primary winding;
d) a first plurality of N capacitors, wherein
e) for each converter bridge, a different one from the first plurality of capacitors is connected between said converter bridge and the at least one primary winding;
f) a control unit configured to switch semiconductor switches of the converter bridges between the conducting and the non-conducting state or vice versa with a switching frequency $f_{res}$ to supply an AC current and/or voltage to the AC intermediate circuit; the method comprising the steps of:
g) for each converter bridge, monitoring a current through said converter bridge;
h) determining whether the current through a first converter bridges deviates from an expected value;

i) adapting, in particular increasing, the switching frequency if the current through a first converter bridges deviates from the expected value.

28) The method in accordance with any of the above method variants, wherein the switching frequency $f_{res}$ is adapted to an adapted switching frequency $$f_{res}^{adapted,1} = f_{res} \cdot \frac{1}{\sqrt{1-\frac{1}{N}}}.$$

29) The method in accordance with any of the above method variants, wherein determining whether a current through one of the converter bridges deviates from an expected value is performed by determining whether said current, in particular an absolute value of said current, is smaller than a given threshold.

30) The method in accordance with any of the above method variants, wherein determining whether a current through one of the converter bridges deviates from an expected value is performed by determining whether said current is at least approximately zero, in particular smaller than $1/100$, $1/1000$ or $1/10000$ of a rated, nominal and/or maximum current of the converter bridge.

31) The method in accordance with any of the above method variants, further comprising the step of, upon determination that the current through a first converter bridges deviates from an expected value, deactivating said first converter bridge.

32) The method for controlling a resonant DC/DC converter according to one of the above method variants, further comprising the step of
a) providing a plurality of N current sensing means;
b) for each converter bridge, measuring the current trough said converter bridge by a different one from the plurality of current sensing means provided between said converter bridge and the at least one primary winding, in particular between said converter bridge and the capacitor connected between said converter bridge and the at least one primary winding.

33) The method for controlling a resonant DC/DC converter according to one of the above method variants, wherein the converter further comprises:
a) an AC/DC converter connected to the secondary side of the AC intermediate circuit,
b) a second DC link, preferably a second DC link capacitor, connected to an output of the AC/DC converter.

34) The method for controlling a resonant DC/DC converter according to one of the above method variants, wherein each of the converter bridges is an inverter half-bridge comprising a first input terminal and a second input terminal, an converter bridge output (alternatively conductively connectable to the first or second input terminal by means of a plurality of semiconductor switches), wherein for each inverter half-bridge, a different one of the first plurality of capacitors is connected in series with the converter bridge output.

35) The method for controlling a resonant DC/DC converter according to one of the above method variants, with a) the primary side of the transformer comprising a plurality of M>1 primary windings, each of the plurality of primary windings having a first and a second terminal;
b) a second plurality of M capacitors; and wherein
c) each of the first plurality of N capacitors is connected between one of the converter bridges and a common node (C);
d) each of the second plurality of M capacitors is connected between the common node and the first terminal of a different one of the plurality of primary windings.

36) The method for controlling a resonant DC/DC converter according to one of the above method variants, with
a) the primary side of the transformer comprising a plurality of M>1 primary windings, each of the plurality of primary windings having a first and a second terminal;
b) a second plurality of M capacitors; the DC/DC converter further comprising
c) a plurality O of common nodes with O<N and O<M and wherein
d) each of the first plurality of N capacitors is connected between one of the converter bridges and one of the common nodes;
e) each of the second plurality of M capacitors is connected between one of the common nodes and the first terminal of a different one of the plurality of primary windings.

37) The method for controlling a resonant DC/DC converter according to one of the above method variants, wherein M≠N, preferably M<N.

38) The method for controlling a resonant DC/DC converter according to one of the above method variants, with the primary side of the transformer comprising a plurality of N primary windings, each of the plurality of primary windings having a first and a second terminal; wherein the converter bridges and the primary windings are connected in pairs via a different one from the first plurality of capacitors connected to the first terminal of the respective one from the plurality of primary windings.

39) The method for controlling a resonant DC/DC converter according to one of the above method variants, wherein
a) each of the converter bridges is an inverter half-bridge comprising a first input terminal and a second input terminal, an converter bridge output (alternatively conductively connectable to the first or second input terminal by means of a plurality of semiconductor switches),
b) each capacitor has a first terminal and a second terminal, and wherein
c) for each inverter half-bridge, the first terminal of each of the respective one of the plurality of capacitors is connected to the respective converter bridge output, and
d) the second terminals of all capacitors from the first plurality of N capacitors are connected together at the common node.

40) The method for controlling a resonant DC/DC converter according to one of the above method variants, wherein
a) each of the converter bridges is an inverter half-bridge comprising a first input terminal and a second input terminal, an converter bridge output (alternatively conductively connectable to the first or second input terminal by means of a plurality of semiconductor switches),
b) each capacitor has a first terminal and a second terminal, and wherein
c) for each inverter half-bridge, the first terminal of each of the respective one of the plurality of capacitors is connected to the respective converter bridge output, and
d) the second terminal of each of the capacitors from the first plurality of N capacitors is connected to a different primary winding.

41) The method for controlling a resonant DC/DC converter according to one of the above method variants, wherein the second terminals of all of the plurality of primary windings are connected together.

42) The method for controlling a resonant DC/DC converter according to one of the above method variants, wherein
a) the first DC link has a positive terminal and negative terminal,
b) the first input terminals of all inverter half-bridges are connected to the positive terminal, and
c) the second input terminals of all inverter half-bridges are connected to the negative terminal.

43) The method for controlling a resonant DC/DC converter according to one of the above method variants, wherein the first DC link further has a neutral terminal and the second terminals of all of the plurality of primary windings are connected to the neutral terminal.

44) The method for controlling a resonant DC/DC converter according to one of the above method variants, wherein the converter is a resonant converter, and each of the plurality of capacitors is a capacitor.

45) The method for controlling a resonant DC/DC converter according to one of the above method variants, wherein the converter further comprises:
a) a second DC link, preferably a second DC link capacitor
b) a second plurality of $N'>1$ converter bridges connected in parallel to the second DC link;
c) the secondary side of the transformer comprising at least one secondary winding;
d) the converter further comprises a third plurality of $N'$ capacitors, wherein
e) for each converter bridge from the second plurality of $N'>1$ converter bridges, a different one from the third plurality of capacitors is connected between said converter bridge and the at least one secondary winding.

46) The method for controlling a resonant DC/DC converter according to one of the above method variants, wherein
a) each one of the first plurality of $N>1$ converter bridges is an converter bridge;
b) the secondary side of the transformer comprises at least one secondary winding; the converter further comprising:
c) a second DC link, preferably a second DC link capacitor;
d) a second plurality of $N>1$ rectifier bridges connected in parallel to the second DC link;
e) a third plurality of $N'$ capacitors, wherein
f) for each rectifier bridge, a different one from the third plurality of capacitors is connected between said rectifier bridge and the at least one secondary winding.

47) The method for controlling a resonant DC/DC converter according to one of the above method variants, with
a) the secondary side of the transformer comprising a plurality of $M'>1$ secondary windings, each of the plurality of secondary windings having a first and a second terminal;
b) a fourth plurality of $M'$ capacitors; and wherein
c) each of the third plurality of $N'$ capacitors is connected between one of the converter bridges and a further common node;
d) each of the fourth plurality of $M'$ capacitors is connected between the further common node and the first terminal of a different one of the plurality of secondary windings.

48) The method for controlling a resonant DC/DC converter according to one of the above method variants, wherein the converter further comprises:
a) a second DC link, preferably a second DC link capacitor
b) a second plurality of $N'>1$ converter bridges connected in parallel to the second DC link; with
c) the secondary side of the transformer comprising a plurality of $N'$ secondary windings, each of the plurality of secondary windings having a first and a second terminal; wherein the converter bridges and the secondary windings are connected in pairs via a different one from the third plurality of capacitors connected to the first terminal of the respective one from the plurality of secondary windings.

49) The method for controlling a resonant DC/DC converter according to one of the above method variants, wherein the converter bridges of the first plurality of $N>1$ converter bridges are active bridges configured to operate in an at least essentially synchronized manner, and if present, the converter bridges of the second plurality of converter bridges are also active bridges configured to operate in an at least essentially synchronized manner.

50) A control unit for controlling a resonant DC/DC converter, in particular according to one of the above embodiments, according to one of the above method variants.

51) A data processing system comprising means for carrying out the method according to one of the above method variants.

52) A computer program product comprising instructions which, when said instructions are executed by a data processing system, cause the data processing system to carry out the method according to one of the above method variants.

The aspects as described above as well as further aspects of the invention will become apparent from and elucidated with reference to the drawings and exemplary embodiments described hereinafter.

BRIEF DESCRIPTION OF THE DRAWINGS

The subject matter of the invention will be explained in more detail in the following text with reference to exemplary embodiments which are illustrated in the attached drawings.

In principle, identical reference symbols in the figures denote identical features or elements.

DETAILED DESCRIPTION OF EXEMPLARY EMBODIMENTS

Figure 1:
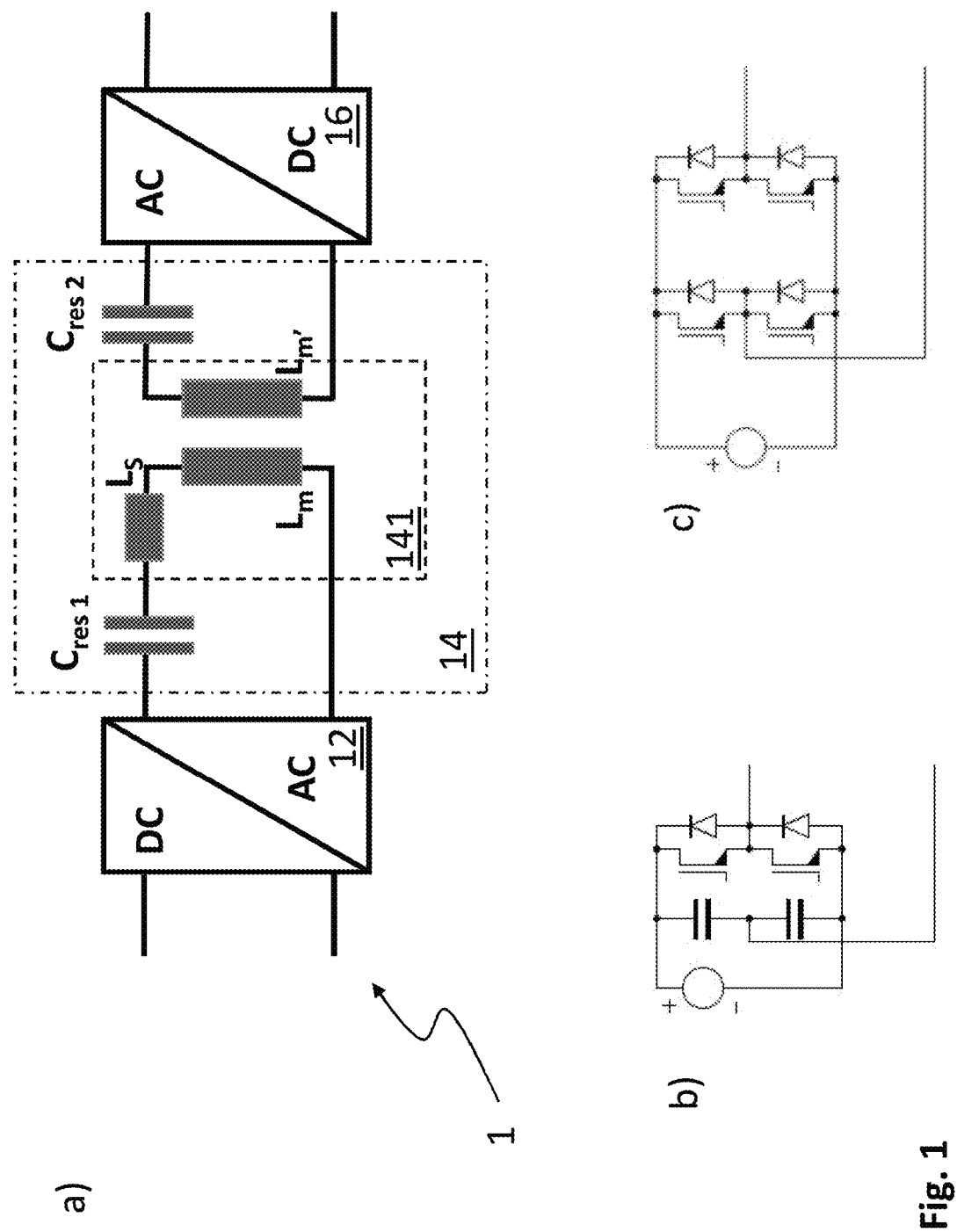
FIG. 1 illustrates a basic, generic, prior art resonant DC/DC converter.

FIG. 1a) illustrates a basic, prior art resonant DC/DC converter 1 which may be considered as a potential starting point for the present invention. DC/AC converter 12 is configured to convert a DC voltage and/or current from a DC source, preferably comprising a DC link capacitor, connected to its input into an AC voltage and/or current of medium frequency, i.e. preferably in a frequency range between 500 Hz and 500 kHz. Said AC voltage and/or current is fed into an AC intermediate circuit 14 comprising a transformer, in particular a medium frequency transformer (MFT), said transformer comprising a primary and a secondary side, and providing galvanic insulation between said sides. The transformer may, inter alia, be characterized by coupled inductances $L_m$ and $L_{m'}$, and a stray inductance $L_s$, with its primary side winding or windings connected to the DC/AC converter via capacitor as impedance element, with said capacitor having a capacitance $C_{res1}$. The capacitor together with the stray inductance is part of a resonant tank comprised by the AC intermediate circuit, which may store electric energy, and which is characterized by a resonance frequency, which in turn depends on the values of $L_s$ and $C_{res1}$. The capacitor is therefore commonly referred to as a resonant capacitor. The transformer transforms voltage and/or current at its primary side in a known manner to a secondary side voltage and/or current. Said secondary side voltage and/or current is subsequently converted by AC/DC converter 16, in particular a rectifier, into a DC voltage and/or current at the output of said AC/DC converter 16. DC/AC converter 12 may, in particular, comprise a plurality of semiconductor switches arranged in a half-bridge configuration corresponding to the one shown in FIG. 1b), or arranged in a full-bridge configuration corresponding to the one shown in FIG. 1c). Likewise, AC/DC converter 16 may, in particular, comprise a plurality of semiconductor switches arranged in a half-bridge configuration corresponding to the one shown in FIG. 1b), or arranged in a full-bridge configuration corresponding to the one shown in FIG. 1c). As an alternative to the variant comprising active bridges as described above and allowing for bi-directional electric power flow, AC/DC converter 16 may, in particular, be embodied without semiconductor switches and comprise diodes only arranged in a half-bridge or full-bridge configuration, in particular free of transistors and thyristors, if only unidirectional electric power flow is required. Resonant DC/DC converters are exemplary described in PCT patent application WO 2018/141092 A1, which is hereby included by reference in their entirety.

Figure 2:
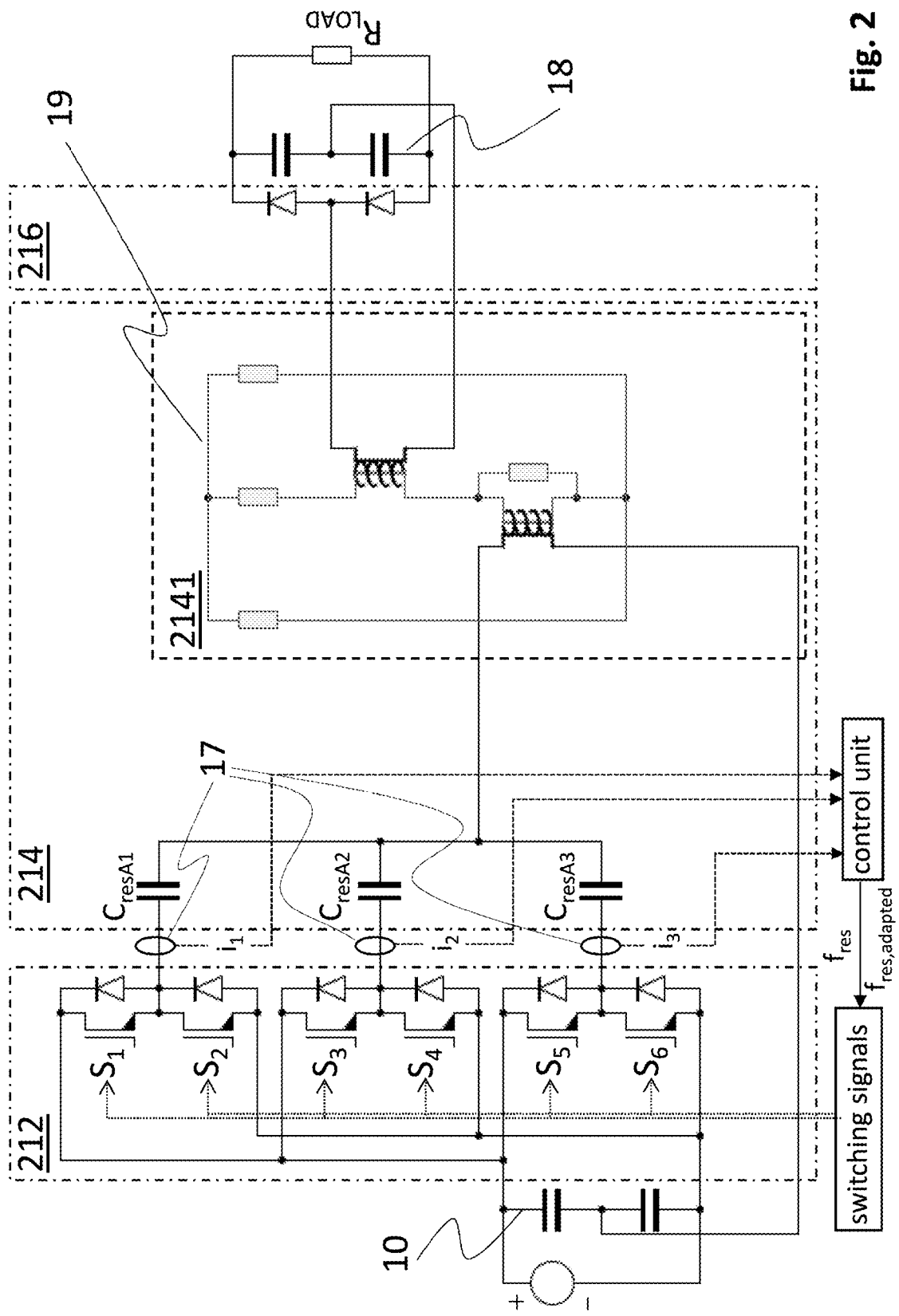
FIG. 2 shows a schematic of an exemplary resonant DC/DC converter in accordance with an embodiment of the invention.

FIG. 2 shows a schematic of an exemplary resonant DC/DC converter in accordance with an embodiment of the invention. The converter comprises a first DC link 10, a DC/AC converter 212 comprising a plurality of semiconductor switches $S_1$, $S_2$, $S_3$, . . . , $S_6$, an AC intermediate circuit 214, an AC/DC converter 216, and a second DC link 18. The DC/AC converter comprises a plurality of active half bridges which are connected to a single, first DC link 10, while each of their outputs is connected via an individual one of a first plurality (N=3) of capacitors $C_{resA1}$, $C_{resA2}$, and $C_{resA3}$, and a common node C to a primary winding of a medium frequency transformer 2141, said transformer providing, inter alia, for galvanic insulation between a primary and a secondary side of said transformer. The primary winding is connected to a common node C, where capacitors $C_{resA1}$, $C_{resA2}$, and $C_{resA3}$, are all connected. Preferably, capacitances of all capacitors of the first plurality of capacitors $C_{resA}$ . . . are identical to one another. Also shown, merely for background information, is a voltage source connected to the first DC link 10, a resistive load connected to the second DC link 18 and a reluctance network 19 indicative of a core and stray flux of the transformer. Also shown is a control unit configured to provide switching signals for periodically switching switches of the converter bridges between the conducting and the non-conducting state or vice versa with a predetermined first switching frequency, and to monitor currents $i_1$, $i_2$, $i_3$ through each of the plurality of active half bridges, respectively, connected to first DC link 10 by means of current sensors 17.

Figure 3:
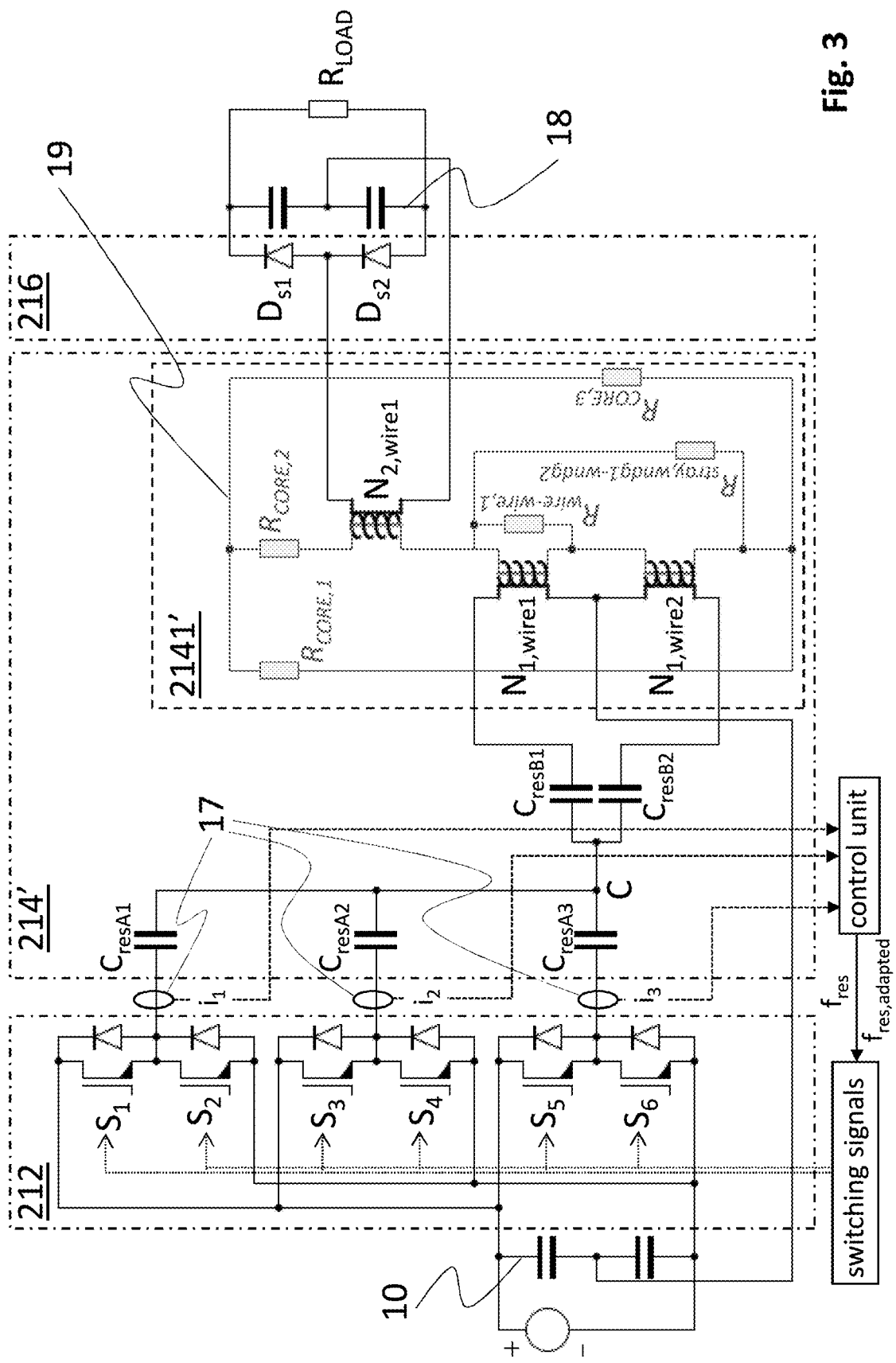
FIG. 3 shows a schematic of an exemplary resonant DC/DC converter in accordance with another embodiment of the invention.

FIG. 3 shows a schematic of an exemplary resonant DC/DC converter in accordance with another embodiment of the invention. The converter comprises a first DC link 10, a DC/AC converter 212 comprising a plurality of semiconductor switches $S_1$, $S_2$, $S_3$, . . . , $S_6$, an AC intermediate circuit 214', an AC/DC converter 216, and a second DC link 18. The converter comprises a plurality of active half bridges which are connected to a single, first DC link 10, while each of their outputs is connected via an individual one of a first plurality (N=3) of capacitors $C_{resA1}$, $C_{resA2}$, and $C_{resA3}$, and a common node C to a primary coil of a medium frequency transformer 2141', said transformer providing, inter alia, for galvanic insulation between a primary and a secondary side of said transformer. The primary coil comprises a plurality of M=2 parallel windings. $N_{1,wire\ 1}$ and $N_{1,wire\ 2}$, i.e. windings electrically connected in parallel, with each winding formed by a wire, and wherein each wire or winding is connected to common node C via an individual one of a second plurality (M=2) of capacitors $C_{resB1}$ and $C_{resB2}$. Providing common node C as a single point of coupling, where capacitors $C_{resA\ \ldots}$ and capacitors $C_{resB\ \ldots}$ are all connected, allows to optimize semiconductor switches and transformer wires independently. Preferably, capacitances of all capacitors of the first plurality of capacitors $C_{resA\ \ldots}$ are identical to one another. Similarly, capacitances of all capacitors of the second plurality of capacitors $C_{resB}$ are also identical to one another, but not necessarily to the capacitances of the first plurality of capacitors $C_{resA\ \ldots}$. Also shown, merely for background information, is a voltage source connected to the first DC link 10, a resistive load connected to the second DC link 18 and a reluctance network 19 indicative of a core and stray flux of the transformer. Also shown is a control unit configured to provide switching signals for periodically switching switches of the converter bridges between the conducting and the non-conducting state or vice versa with a predetermined first switching frequency, and to monitor currents $i_1$, $i_2$, $i_3$ through each of the plurality of active half bridges, respectively, connected to first DC link 10 by means of current sensors 17.

In the embodiments as shown in FIGS. 2 and 3, the capacitors $C_{resA1}$, $C_{resA2}$, . . . and—if present—$C_{resB1}$, $C_{resB2}$ replace the resonant capacitor $C_{res1}$ of FIG. 1a), and jointly act as resonant capacitor of the AC intermediate circuit 214, 214'. Said capacitors $C_{resA\ \ldots}$ and—if present—$C_{resB}$ may thus be regarded as a split resonant capacitors, with each individual one of said capacitors acting as a partial resonant capacitor. Due to the presence of these partial resonant capacitors, current through each active half bridge or bridge leg is not defined by power module parasitics, inhomogeneous temperature distributions and/or semiconductor switch characteristics (which are not perfectly equal for all chips), but by the resonant tank which is defined by the transformer stray flux (approximately equal for all parallel wires) and the split resonant capacitors (which have, in a defined range, a limited maximum deviation from a referenced capacitance, e.g. 5%). This makes a current distribution homogenous and stable without requiring additional measures or effort.

Furthermore, connecting the parallel half bridges via split resonant capacitors provided also between common node C and the plurality of M=2 parallel windings prevents circulating currents in the transformer winding which would otherwise create huge losses in MFTs and/or significantly reduce the converter's performance.

Converter bridges for relatively low current employing low-cost discrete off-the-shelf components may thus be used, and connected them via split resonant capacitors ($CA_1$, $C_{resA2}$, $C_{resA3}$, ... $C_{resAi}$) to a common point, in particular common node C, from where the medium frequency transformers (MFT) primary winding is connected. In case the primary winding is composed of parallel wires, further components ($C_{resB1}$, $C_{resB2}$, ... $C_{resBi}$) of the split resonant capacitor $C_{res}$ allow current balancing in the transformer wires as well, with an effective capacitance given by $$C_{res} = \frac{\sum C_{resA,i} \cdot \sum C_{resB,i}}{\sum C_{resA,i} + \sum C_{resB,i}}.$$

If the multiple converter bridges employ low-current power semiconductors, gate drivers may be realized in very low-cost, e.g. boot-strap design which makes the required higher number of gate drivers no relevant cost factor any more. A potentially resulting reduced system reliability due to a significantly increased number of components and gate drivers is addressed by means of the switching frequency adaptation in accordance with the invention.

Generation of circulating currents, in particular in a configuration of two windings connected in parallel without impedance elements in between, and with each winding comprising a plurality of turns, may be understood as follows: Each of the turns is exposed to a magnetic stray field, e.g. in a windings window formed by a core of the transformer. Parallel litz wires forming individual windings which are connected at input and output terminals of the transformer form a loop which is exposed to the magnetic stray field. The magnetic stray field changes with the MFT's operating frequency, resulting in a voltage which drives a circular current in this loop. The circulating current adds to a nominal current in the MFT which may result in one litz wire carrying more than half of the nominal current, and the parallel one carrying accordingly less than half of the nominal current. If the circulating current is large enough, one litz wire can carry more than a total nominal current, and then the parallel one carries a negative (180° phase-shifted) current. In this way, not only is a total available copper cross section effectively reduced by 50%, but additional losses are introduced, and a maximum output power of the MFT is reduced by a factor two or more.

In the following the impact of losing one or more split resonant capacitors on the resonance frequency of the converter due to e.g. a failure of a converter bridge leg is discussed. The sum of all converter-side capacitors $C_{resA1}$, $C_{resA2}$, and $C_{resA3}$, is referred to as as $C_{resA}$ and the sum of all primary-winding-side capacitors $C_{resB1}$ and $C_{res2}$ as $C_{resB}$, see equations (1) and (2). The resonant capacitance $C_{res}$ is defined in equation (3), and, as shown in equation (4), depends on transformer stray inductance $L_s$ and a selected switching frequency $f_P$ of the half bridges, which preferably is slightly lower than a resonance frequency $f_{res}$ in order to operate at minimum switching losses, in particular by utilizing soft switching.

If n out of N converter bridges fail, and, accordingly, n split capacitors (each of capacitance $C_{resAi}$) are lost, an effective resonant capacitance $C_{res}^{Fail}$ changes according to equation (5), and the resonant frequency changes according to equation (6). The control scheme in accordance with the invention would adjust the switching frequency of the remaining bridge legs according to (6) in for the embodiment as shown in FIG. 3:

$$C_{resA} = \sum C_{resA,i} \rightarrow C_{resA,i} = \frac{1}{N} C_{resA1} \qquad (1)$$

$$C_{resB} = \sum C_{resB,i} \qquad (2)$$

$$C_{res} = \frac{\sum C_{resA,i} \cdot \sum C_{resB,i}}{\sum C_{resA,i} + \sum C_{resB,i}} = \frac{C_{resA} \cdot C_{resB}}{C_{resA} + C_{resB}} \qquad (3)$$

$$f_{res} = \frac{1}{2\pi\sqrt{C_{res} \cdot L_s}} \qquad (4)$$

$$C_{res}^{Fail} = \frac{C_{resA}\left(1 - \frac{n}{N}\right) \cdot C_{resB}}{C_{resA}\left(1 - \frac{n}{N}\right) + C_{resB}} = \frac{\left(\frac{N}{n} - 1\right) C_{resA}}{1 + \left(\frac{N}{n} - 1\right)\frac{C_{resA}}{C_{res}}} \qquad (5)$$

$$f_{res}^{nFail} = \frac{1}{2\pi\sqrt{C_{res}^{xFail} \cdot L_s}} = \sqrt{f_{res}^2 + \frac{1}{(2\pi)^2 \left(\frac{N}{n} - 1\right) C_{resA} \cdot L_s}} \qquad (6)$$

$$f_{res}^{nfail}(C_{res} = C_{resA}) = f_{res} \cdot \frac{1}{\sqrt{1 - \frac{n}{N}}} \qquad (7)$$

For the case with no primary-winding-side split capacitors ($C_{res}=C_{resA}$, no $C_{resB}$ as in the embodiment shown in FIG. 2), the equation of the new resonant frequency simplifies to equation (7). As may be derived, if one loses about ⅙ of the parallel half-bridges, the resonant frequency will increase by about 10%. The controller thus has to adjust the switching frequency of the remaining bridge legs accordingly.

If a converter bridge becomes defective with its switches in the non-conducting state, its output current becomes zero, and this will be detected. If converter bridge becomes defective with its switches in the conducting state, some circuit breaker has to disconnect the affected converter, and its monitored output current becomes zero as well. Therefore, there the method in accordance with the invention works independently on a kind of converter bridge failure.

Figure 4:
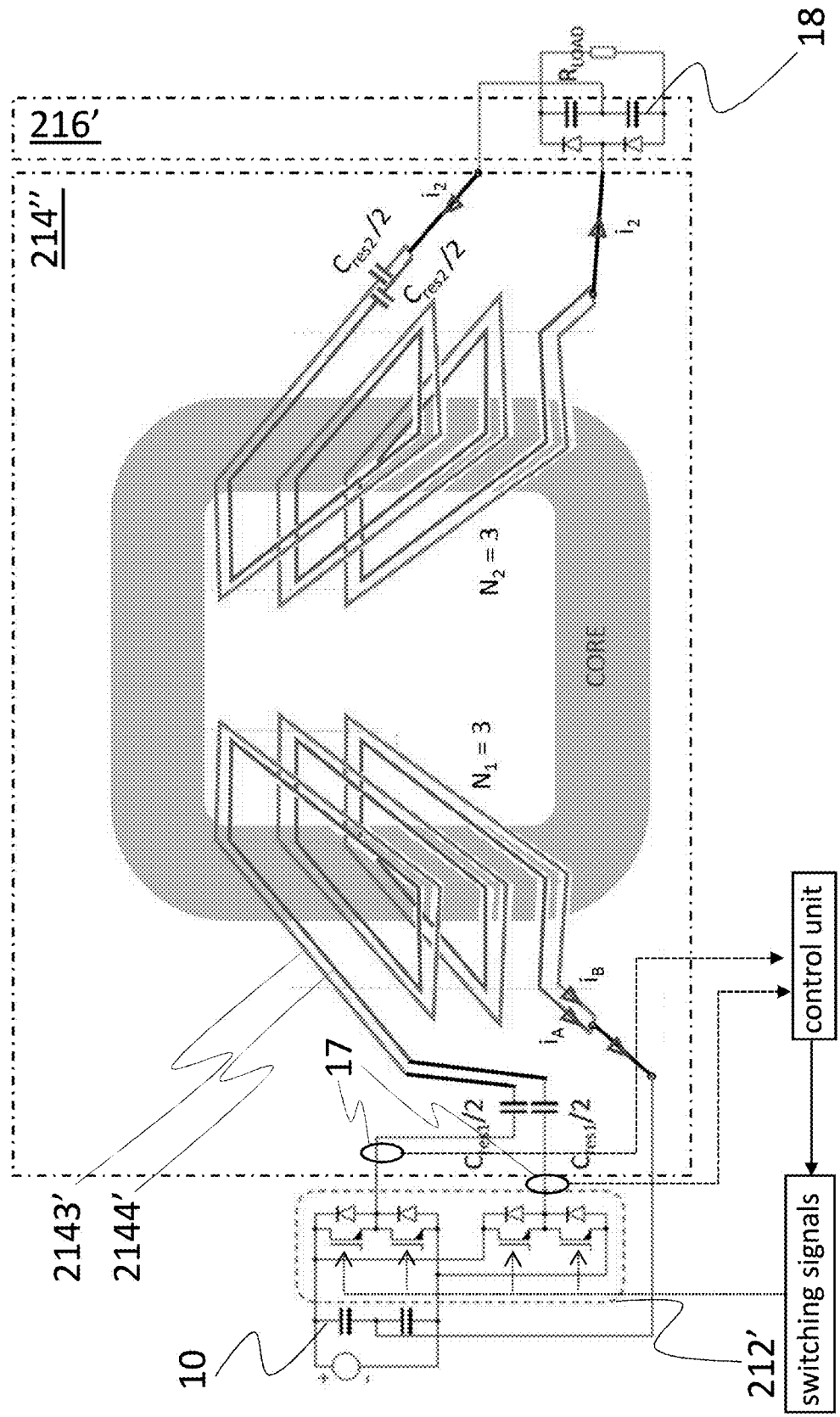
FIG. 4 illustrates an exemplary, physical winding configuration of a DC/DC converter in accordance with another embodiment of the present invention.

FIG. 4 illustrates an exemplary, physical winding configuration of a DC/DC converter in accordance with another embodiment of the present invention. As may be seen, a spatial relation of the parallel wires 2143' and 2144' remains unchanged along and over the entire winding, i.e. no transpositions occur. In the prior art, such transpositions are for example provided by parallel wires twisted around one another or otherwise intertwined or interlaced.

However such transpositions require additional manufacturing effort, especially for foil windings, lead to an increased effective wire-length, exhibit limited efficiency in MFTs with only a few winding turns and may lead to high voltage insulation challenges, e.g. due to geometric inhomogeneities in a vicinity of transposition locations.

In all embodiments shown, the secondary side of the DC/DC converter (as shown on the right hand side of FIGS. 2 and 3) may alternatively be embodied in analogy to the primary side.

Advantageous characteristics of the invention are:

High level of redundancy resulting in high reliability.

Enables reliable low-cost inverter based on off-the-shelf discrete power devices.

High level of modularity and scalability due to passive current-sharing between paralleled bridge legs.

No extra components are required. Splitting the resonant capacitor as proposed keeps a total capacitor/inductor size, in particular a total/summed capacitance or inductance, unchanged.

Allows low-cost realization of resonant DC/DC converter cells, employing and/or enabling off-the-shelf power semiconductor switches for high current applications simply by adding further half bridges.

Allows low-cost realization of resonant DC/DC converter cells using wide bandgap semiconductor switches for high current applications, which would otherwise become increasingly difficult due to fast switching speeds and smaller chip size (as compared to non-wide bandgap semiconductor switches).

No theoretical limitation of a number (N or N') of parallel converter bridges, i.e. power semiconductor switches.

Simple, robust, no active current balancing control required.

Maximum and/or nominal electric power per MFT may be increased, due to an increase of a maximum current a single MFT can handle. This is key to building economically efficient MFTs. In higher-power (and thus larger) MFTs, an insulation effort, in particular a volume required for sufficient insulation is, in a relative sense, reduced. An alternative way of providing higher power via higher current would be to parallel-connect entire resonant converter or dual active bridge converter cells in an SST, or even to parallel-connect entire SSTs, and thus the number of MFTs required. But this would not increase a power level of the individual MFTs.

Circulating currents in parallel transformer windings which are built from parallel wires may be efficiently suppressed due to split resonant capacitors or split energy transfer inductors which block such currents—this also enables employment of more common litz wire of smaller cross-section, which is potentially probably cheaper, and may be manufactured using reduced effort and resources.

Very general concept for DC/DC resonant converters that have to deal with hundreds of amps; not only cells in MV-grid connected SSTs but also for high-power low-voltage applications, as e.g. required in various EV fast charger topologies.

Unless specified otherwise, a control unit, also referred to as a control system or controller, may be any (first) device, apparatus, system, unit, etc. configured for and/or capable of managing, commanding, directing, or regulating another (second) device, apparatus, sensor, unit, etc., wherein both device, apparatus, system, unit, etc., may be part of a higher lever or superordinate (third) device, apparatus, sensor, unit, etc. The control unit may apply open-loop control or close-loop control, wherein the latter may in particular take into account feedback from sensors.

The control unit may comprise and/or be implemented it least in part on a "computer,", "processor", "processing device", "central processing unit (CPU)", "computing device", which terms shall not be limited to just those devices literally, but shall broadly refer to a data processing system, also including a microcontroller, a microcomputer, a programmable logic controller (PLC), and application specific integrated circuit, and other programmable circuits, wherein these terms may be used interchangeably herein. In embodiments described herein, memory may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), a digital versatile disc (DVD), a USB stick and/or a flash memory card (e.g. CF. SD, miniSD, microSD) may also be used. Also, in the embodiments described herein, input channels may comprise, but are not limited to, computer peripherals associated sensors or sensing means, or with an operator interface such as a mouse and a keyboard. Furthermore, in the exemplary embodiments, additional output channels may include, but not be limited to, an operator interface monitor.

Further, as used herein, the terms "software" and "firmware" are interchangeable and include any computer program which may be stored in memory for execution by computers as defined above, workstations, clients, and/or servers.

As used herein, the term "non-transitory computer-readable media" is intended to be representative of any tangible computer-based device implemented in any method of technology for short-term and/or long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a computer as defined above, cause the computer to perform at least a portion of the methods described herein. Moreover, as used herein, the term "non-transitory computer-readable media" may include all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Unless specified otherwise, a connection, in particular between any two entities, including in particular nodes, points, terminals, elements, devices, etc. or combinations thereof, as used throughout this patent application refers to an electrically conductive connection, as in particular established by a wire, cable, busbar, a conductive track, trace or line on e.g. a (printed) circuit board, solder, etc. The electrically conductive connection is preferably at least substantially direct, in particular without any discrete elements, as, in particular, resistors, capacitors, inductors, or other passive or active elements or devices connected between the connected entities. The electrically conductive connection thus has at least essentially negligible resistance, capacitance and inductance, preferably at least essentially zero resistance, capacitance and inductance. In particular, resistance, capacitance and inductance of the electrically conductive connection are exclusively parasitic by nature. Further, resistance, capacitance and inductance of the electrically conductive connection significantly smaller (preferably by a factor of $1/100$, $1/1000$ or $1/10000$) than resistances, capacitances and impedances of resistors, capacitors or inductors, respectively, connected by the electrical conductive connection, and/or comprised by an electric circuit or network which comprises the electrically conductive connection.

Unless specified otherwise, an electric connection or electrical connection is identical to connection as defined above.

Unless specified otherwise, if two entities, including in particular nodes, points, terminals, elements, devices, etc. or combinations thereof, are said to be connected, electrically connected or to be (electrically) connected together, a connection as defined above exists between the two entities.

Unless specified otherwise, if a first and a second entity, including in particular a first and second node, point, terminal, element, device, etc. or combinations thereof, are said to be connected via a third entity, including in particular a third node, point, terminal, element, device, or with such a third entity (in) between, a connection as described above exists between the first and third entities as well as between the third and second entities.

However, no connection as described above, in particular no at least substantially direct connection exists between the first and second entities. If explicitly specified, the third element may in particular also be a connection, in particular a conductor, wire, cable, busbar etc. In such case, it may be assumed that no connection as described above other than the specified one is present.

Unless stated otherwise, it is assumed that throughout this patent application, a statement $a \approx b$ implies that $|a-b|/(|a|+|b|)<10$, preferably $|a-b|/(|a|+|b|)<100$, wherein a and b may represent arbitrary variables as described and/or defined anywhere in this patent application, or as otherwise known to a person skilled in the art. Further, a statement that a is at least approximately equal or at least approximately identical to b implies that $a \approx b$, preferably $a=b$. Further, unless stated otherwise, it is assumed that throughout this patent application, a statement that $a >> b$, or that a is significantly larger or much larger than b, implies that $a>10b$, preferably $a>100b$; and statement that $a<<b$, or that a is significantly smaller or much smaller than b implies that $10a<b$, preferably $100a<b$. Further, a statement that two values a and b substantially deviate from one another, or differ significantly, implies that $a \approx b$ does not hold, in particular that $a >> b$ or $a << b$. Unless stated otherwise, N, M, O, N', M', O', are used throughout this patent application to represent integer numbers.

This description and the accompanying drawings that illustrate aspects and embodiments of the present invention should not be taken as limiting the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope of the following claims. In particular, the present invention covers further embodiments with any combination of features from different and/or individual embodiments as described above and below. Embodiments in accordance with the invention may, in particular, include further and/or additional features, elements, aspects, etc. not shown in the drawings or described above.

The disclosure also covers all further features shown in the Figures, individually, although they may not have been described in the afore or following description. Also, individual alternatives of the embodiments described in the Figure and the description and individual alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude further or additional features, elements, steps etc., and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially". "about", "approximately" and the like in connection with an attribute, property or a value particularly also comprise exactly the attribute, property or value, respectively, as stated. The term "approximately" or "about" in the context of a given numerate value or range refers to a value or range that is, e.g., within 20%, within 10%, within 5%, or within 2% of the given value or range, and, in particular, also comprises the exact value or range as stated. Components described as coupled or connected may be electrically or mechanically directly coupled, or they may be indirectly coupled via one or more intermediate components. Any reference signs in the claims shall not be construed as limiting the scope.

The invention claimed is:
1. A resonant DC/DC converter, comprising:
a first DC link;
a DC/AC converter comprising a first plurality of N>1 converter bridges connected in parallel to the first DC link,
wherein N is an integer,
wherein each converter bridge of the first plurality of N>1 converter bridges comprising a plurality of semiconductor switches, and
wherein each semiconductor switch of the plurality of semiconductor switches may be switched between a conducting state and a non-conducting state;
an AC intermediate circuit connected to the DC/AC converter and comprising:
a transformer having a primary side and a secondary side;
wherein the primary side comprises a plurality of M>1 primary windings,
wherein M is an integer;
a first plurality of N capacitors,
wherein each capacitor of the first plurality of N capacitors is connected between a respective converter bridge of the first plurality of N>1 converter bridges and a common node, a second plurality of M capacitors,
  wherein each capacitor of the second plurality of M capacitors is connected between the common node and a respective primary winding of the plurality of M>1 primary windings;
a control unit configured to switch the plurality of semiconductor switches of the first plurality of N>1 converter bridges between the conducting state and the non-conducting state or vice versa with a switching frequency to supply an AC current or voltage to the AC intermediate circuit;
a plurality of N current sensing means,
  wherein, for each converter bridge of the first plurality of N>1 converter bridges, a current sensing means of the plurality of N current sensing means is provided for monitoring a current through the converter bridge of the first plurality of N>1 converter bridges;
wherein the control unit is configured to determine whether the current through a converter bridge of the first plurality of N>1 converter bridges deviates from an expected value; and
wherein the control unit is configured to increase the switching frequency in response to the current through the converter bridge of the first plurality of N>1 converter bridges deviating from the expected value.

2. The resonant DC/DC converter according to claim 1, wherein the control unit is configured to adapt the switching frequency according to an adapted switching frequency for switching a remaining semiconductor switches of the plurality of semiconductor switches of a remaining N−1 converter bridges after the converter bridge of the first plurality of N>1 converter bridges deviates from the expected value.

3. The resonant DC/DC converter according to claim 1, wherein the control unit is configured to determine whether the current through the converter bride of the first plurality of N>1 converter bridges deviates from the expected value by determining whether an absolute value of the current is smaller than a given threshold.

4. The resonant DC/DC converter according to claim 1, wherein the control unit is configured to determine whether the current through the converter bridge of the first plurality of N>1 converter bridges deviates from the expected value by determining whether the current is smaller than $\frac{1}{100}$ of a rated, nominal, or maximum current of each converter bridge.

5. The resonant DC/DC converter according to claim 1, wherein the control unit is configured to, upon determination that the current through the converter bridge of the first plurality of N>1 converter bridges deviates from the expected value, deactivate the converter bridge.

6. The resonant DC/DC converter according to claim 1, wherein for each converter bridge of the first plurality of N>1 converter bridges, the current sensing means of the plurality of N current sensing means is provided between each converter bridge and each capacitor connected between each converter bridge and the plurality of M>1 primary windings.

7. The resonant DC/DC converter according to claim 1, wherein AC current sensors are used as the plurality of N current sensing means for measuring an AC current output by the first plurality of N>1 converter bridges.

8. The resonant DC/DC converter according to claim 1, wherein the first DC link comprises a first DC link capacitor.

9. The resonant DC/DC converter according to claim 1, wherein the transformer is a medium frequency transformer configured to operate at a frequency range from 500 Hz to 500 kHz.

10. A method for controlling a resonant DC/DC converter, the resonant DC/DC converter comprising:
  a first DC link;
  a DC/AC converter comprising a first plurality of N>1 converter bridges connected in parallel to the first DC link,
    wherein N is an integer,
    wherein each converter bridge of the first plurality of N>1 converter bridges comprising a plurality of semiconductor switches,
    wherein each semiconductor switch of the plurality of semiconductor switches may be switched between a conducting state and a non-conducting state;
  an AC intermediate circuit connected to the DC/AC converter and comprising:
    a transformer having a primary side and a secondary side;
      wherein the primary side comprises a plurality of M>1 primary windings,
      wherein M is an integer;
    a first plurality of N capacitors,
      wherein each capacitor of the first plurality of N capacitors is connected between a respective converter bridge of the first plurality of N>1 converter bridges and a common node;
    a second plurality of M capacitors,
      wherein each capacitor of the second plurality of M capacitors is connected between the common node and a primary winding of the plurality of M>1 primary windings; and
  a control unit configured to switch the plurality of semiconductor switches of the first plurality of N>1 converter bridges between the conducting state and the non-conducting state or vice versa with a switching frequency to supply an AC current or voltage to the AC intermediate circuit;
wherein the method comprises:
  for each converter bridge of the first plurality of N>1 converter bridges, monitoring a current through each converter bridge;
  determining whether the current through a converter bridge of the first plurality of N>1 converter bridges deviates from an expected value; and
  increasing the switching frequency if the current through the converter bridge of the first plurality of N>1 converter bridges deviates from the expected value.

11. The method according to claim 10, wherein the switching frequency is adapted to an adapted switching frequency for switching a remaining semiconductor switches of the plurality of semiconductor switches of a remaining N−1 converter bridges after the converter bridge of the first plurality of N>1 converter bridges deviates from the expected value.

12. The method according to claim 10, wherein determining whether the current through the converter bridge deviates from the expected value is performed by determining whether an absolute value of the current is smaller than a given threshold.

13. The method according to claim 10, wherein determining whether the current through the converter bridge deviates from the expected value is performed by determining whether the current is smaller than $\frac{1}{100}$ of a rated, nominal, or maximum current of each converter bridge.

14. The method according to claim 10, further comprising: upon determination that the current through the converter bridge deviates from the expected value, deactivating the converter bridge.

15. The method according to claim 10, further comprising:
provide a plurality of N current sensing means; and
for each converter bridge, measuring the current through each converter bridge of the first plurality of N>1 converter bridges by a current sensing means of the plurality of N current sensing means provided between each converter bridge and each capacitor connected between each converter bridge and the plurality of M>1 primary windings.

16. A control unit for controlling the resonant DC/DC converter according to the method of claim 10.

17. A non-transitory computer program product comprising instructions which, when said instructions are executed by a data processing system, cause the data processing system to carry out the method according to claim 10.

18. The method according to claim 10, wherein the first DC link comprises a first DC link capacitor.

19. The method according to claim 10, wherein the transformer is a medium frequency transformer configured to operate at a frequency range from 500 Hz to 500 kHz.

* * * * *